Jan. 21, 1930.  L. RIBIÉRAS  1,744,176
COMBINED RECORDING AND METERING APPARATUS
Filed Sept. 15, 1927  4 Sheets-Sheet 2
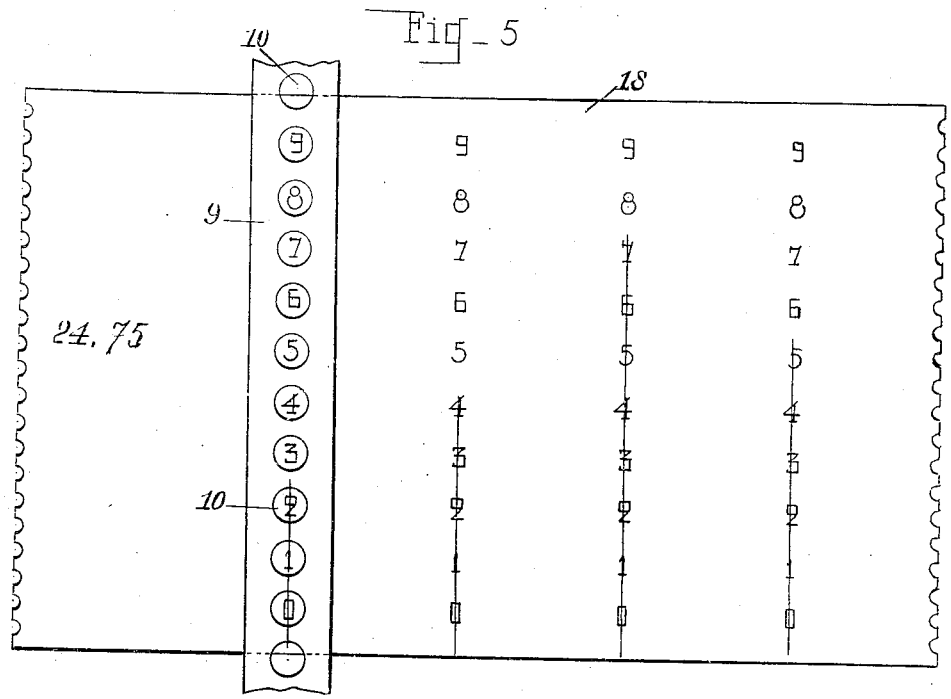
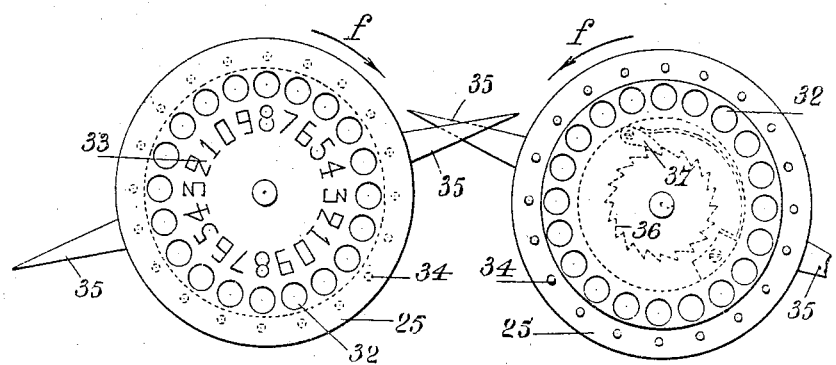
Inventor:
L. Ribiéras.
By Langner, Parry, Card & Langner
Attys

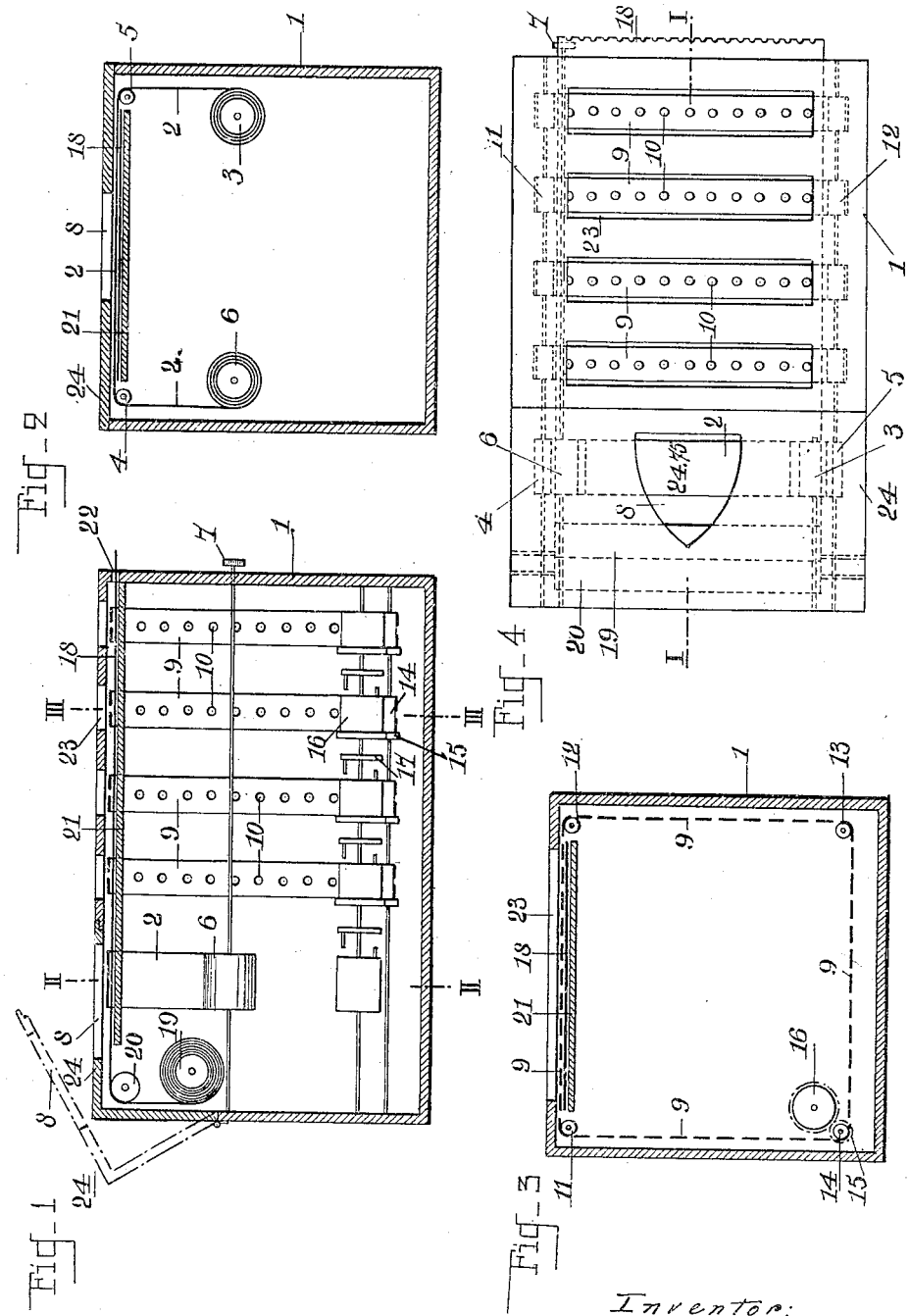

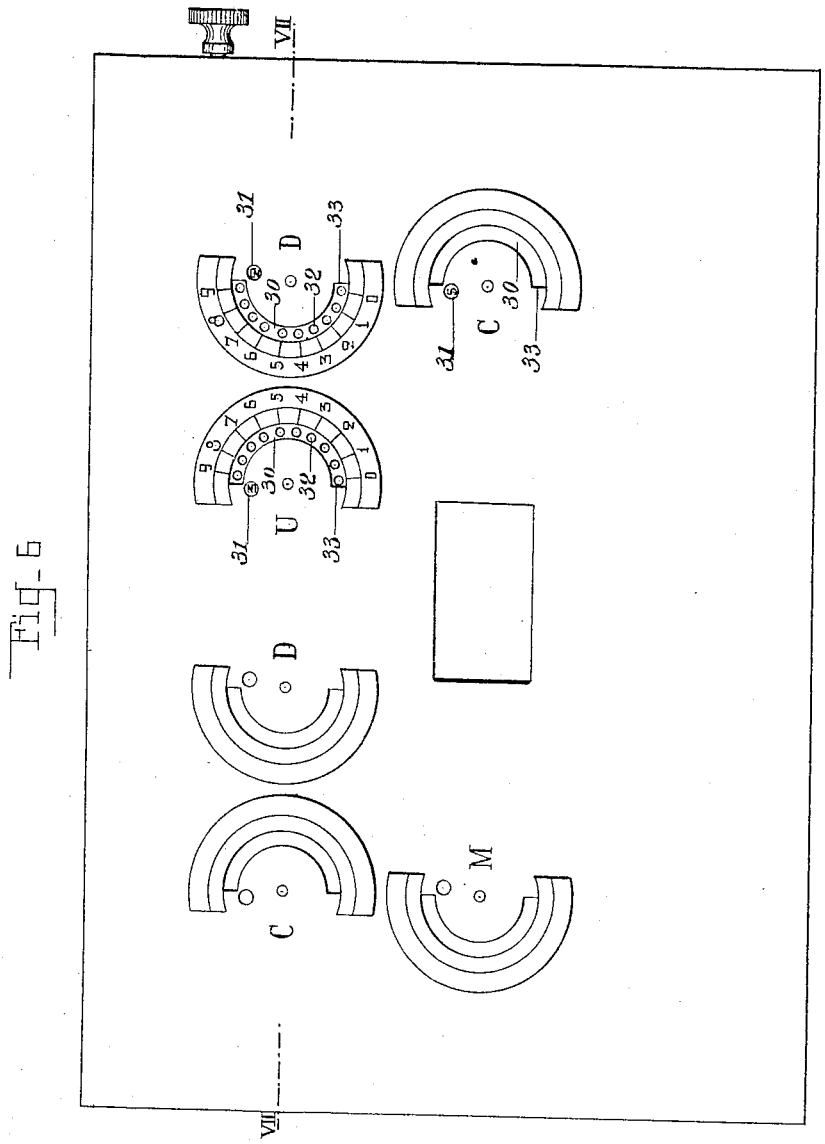

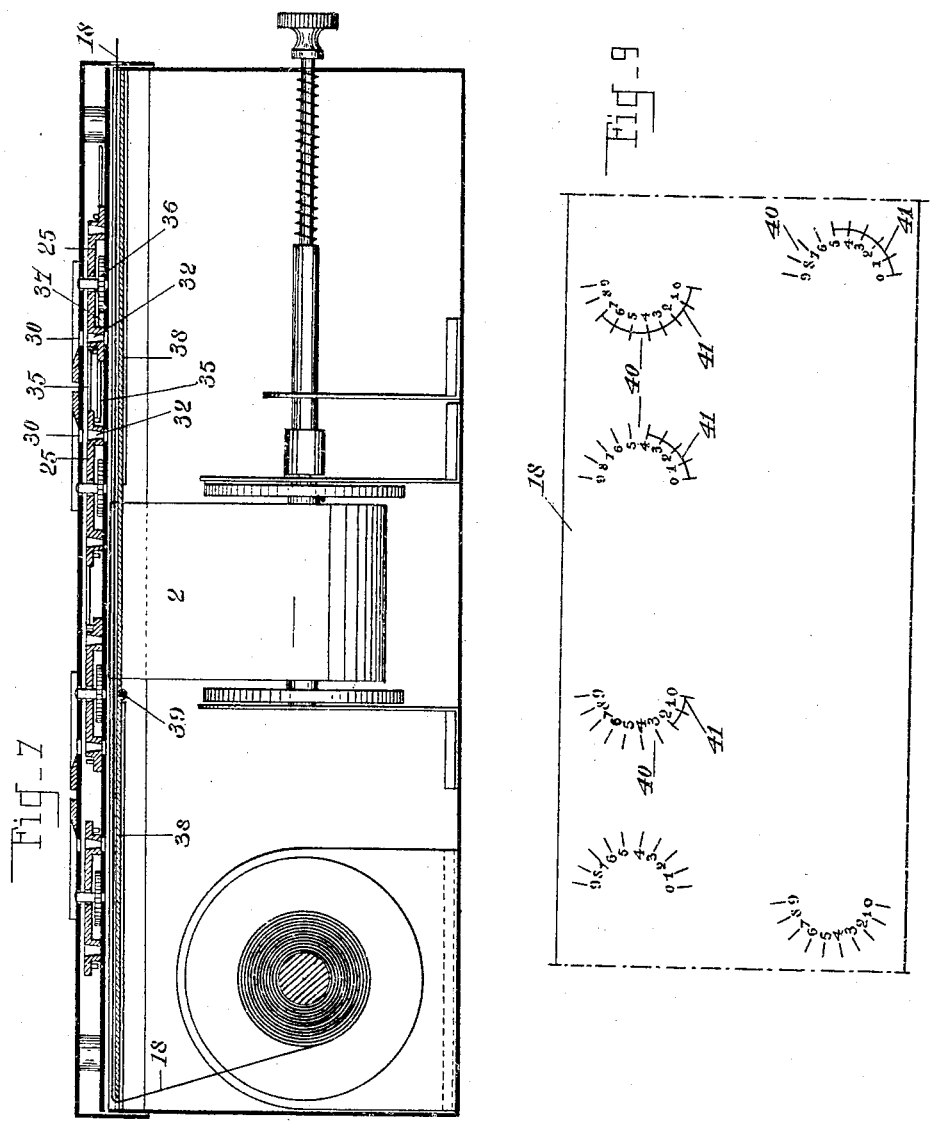

Patented Jan. 21, 1930

1,744,176

UNITED STATES PATENT OFFICE

LOUIS RIBIÉRAS, OF ISSY-LES-MOULINEAUX, FRANCE

COMBINED RECORDING AND METERING APPARATUS

Application filed September 15, 1927, Serial No. 219,762, and in France September 21, 1926.

In large stores in which numerous sellers are employed, it is the general custom to employ a pad comprising sales slips and stubs upon which the sellers may record the amounts of the purchases in duplicate.

The sheet or slip representing the purchase is detached and is presented to the cashier for payment, and it is then placed upon a pointed file together with the slips from various departments of the store. At the end of the day, the slips are classified and assembled according to the various departments or sections, and a record is made for each section.

This method is a source of complications, and is not of the most reliable nature, since the figures may be badly inscribed, and errors may arise for this reason.

The present invention relates to an apparatus which comprises in combination, firstly means for producing a record at the same time upon a detachable sheet or slip and upon a record band, and secondly means for the obtainment of inscribed checking data and for the metering of the total amounts.

As concerns the said checking data, I form lines whose length corresponds to the amounts integral and fractional—to be recorded. The execution of the said lines also serves to actuate the metering device or counter, so that a simple operation effected by the seller will suffice to inscribe the record and to operate the metering device.

The following description with reference to the accompanying drawings which are given by way of example relates to two constructional forms of the apparatus according to my said invention.

In the first form of the apparatus, I employ a suitable device for actuating the said meter; the said device comprises, for each set of figures or numerals, an endless band which is subdivided by equally-spaced holes, and the said band is caused to travel above and near a suitable traveling paper band. The motion of the said endless band automatically actuates a pinion pertaining to the mechanism of the said meter.

In the second form of the apparatus, the said endless bands are replaced by disks pierced with circular rows of holes, below which is disposed the traveling record band. The rotation of the said disks actuates the meter.

In the appended drawings:—

Fig. 1 is a diagrammatic sectional view of the first form of the apparatus, on the line I—I of Fig. 4. Figs. 2 and 3 are diagrammatic sectional views of the said apparatus respectively on the lines II—II and III—III of Fig. 1, in which all parts which are not necessary for the description are eliminated. Fig. 4 is a plan view of the apparatus. Fig. 5 shows a sales sheet or slip delivered by the apparatus, and a portion of an endless band coacting with the meter. Fig. 6 is a plan view of the second form of construction of the apparatus, and Fig. 7 is a lengthwise section on the line VII—VII of Fig. 6. Fig. 8 is a detail view showing the transfer between two successive disks. Fig. 9 shows a sales slip which is employed in this apparatus.

The apparatus shown in Figs. 1 to 5 consists of a casing 1 which contains all the parts of the apparatus.

The paper recording band 2 is wound on the drum 3 which is provided with a brake in order to prevent all improper unwinding of the paper; the band then passes over the rollers 4 and 5 and is wound on the drum 6 which is controlled by the milled knob 7, the paper thus travels adjacent the aperture 8 formed in one side of the casing 1.

The four elements 9 consist of endless bands of a strong material which are pierced with holes 10 of like diameter and equally spaced apart; said bands are disposed upon the respective drums or pulleys 11—12—13—14; the drum 14 comprises means, known per se, whereby the band will be prevented from slipping thereon, and it is secured to a gear wheel 15 engaging a counting disk 16 carrying figures which may successively appear in an opening in the casing 1, not shown. The said disk comprises a transferring or carrying device 17—shown diagrammatically in Fig. 1—as that at each revolution of the disk 16 the indicating disk of a higher order will be advanced by one unit. The bands 9 travel adjacent the respective openings 23 in the casing 1.

A band which consists of a series of sheets or slips is wound upon the drum 19 which is provided with a brake, not shown. The said band is guided by a drum 20, and it proceeds above a board or table 21 and also below the record band 2 and the endless bands 9, and issues from the said casing through the aperture 22; said band consists of detachable sheets or slips of the kind shown in Fig. 5. Each sheet or slip 18 carries four rows of figures (0 to 9) so disposed as to be visible—when in the proper position—through the holes 10 in the bands 9.

The operation is as follows:—

Let it be supposed that the customer has purchased an article for 24.75 francs; the seller inscribes on the record band this sum of 24.75 francs (Fig. 4) and this number is reproduced on the slip in two colors—the francs in black and the centimes in red—by the use of a two-color carbon paper, or preferably means of a special record band which serves as a carbon piece (Fig. 5). The seller then inserts the point of his pencil through the hole in the centimes band 9 corresponding to the number 5 of the paper slip, and he successively crosses out the numbers 5—4—3—2—1—0, while drawing forward the centimes band 9. For the decimes column, he inserts his pencil point into the hole corresponding to the figure 7, and then proceeds as before to cross out the numbers 7—6—5—4—3—2—1—0, while drawing forward the said decimes band.

For the francs and the tens of francs, he proceeds in like manner to insert the pencil point into the hole corresponding to the figure 4 for the francs, and corresponding to the figure 2 for the tens of francs.

At the end of the operation, the paper slip will thus carry the total sum and also four rows of crossed-out figures; the slip is then detached, and it can be presented to the cashier for payment.

The motion of the endless bands 9 actuates the metering device in a corresponding manner.

The record band will thus contain the list of all sales in the order of time, and other data can be recorded at will. Observation can be made at all times, through the suitable apertures, of the total sum of the amounts inscribed which are recorded by the said meter. A slip can be detached which shows the amount of the sale and other indications if desired, as well as the lines which afford a check upon any errors in actuating the meter.

In the second construction which is shown in Figs. 6 to 9, I employ as before a sheet or slip 18 and a record band 2, but the aforesaid endless bands 9 are herein replaced by the juxtaposed disks 25 which are partly visible through openings of suitable shape 30 formed in the upper cover. The disks 25 comprise various holes 32 in a circular row whereof a certain number, for instance ten for the respective disks representing francs tens, hundreds of francs, etc., and such disks are visible through the respective semicircular apertures 30. Each disk comprises a set of numbers 33 a number being situated on the radius of a hole, in each case. The numbers corresponding to said holes are visible through an aperture 31 in the cover.

I employ a transfer or carrying device between the successive disks whereby a number of a higher series will be recorded per ten numbers of a lower series.

The seller inserts his pencil point into the hole 32 situated next a given figure of a set, for instance 7, and he thus turns the disk according to the arrow $f$, until the pencil point makes contact with the straight end of the slot at 33; he draws a line, corresponding to this straight end, upon the paper sheet or slip which is situated below the said disk, and this unit amount is recorded on the meter.

The figure may be carried over in a very simple manner, as follows:

Each disk comprises a set of pins or studs 34 on one face, and each time that ten units of a disk of a lower order have passed along, said studs will engage an arm 35 secured to the last-mentioned disk. A ratchet wheel 36 mounted on the main frame coacts with a pawl 37 mounted on the disk 25, whereby all back motion of said disk will be prevented. In this manner, each time that a wheel of a lower order advances by ten units, one of the studs of the disk engages an arm by which it is moved forward by one division. To save space, the disks carry the studs alternately on their upper and lower faces, and the actuating arms for each disk are mounted on the face opposite the studs. Obviously, I may substitute a toothed ring for the set of studs.

In this second apparatus, the band consisting of the slips 18, and also the record band 2, travel above a board or table 38 which is not made in one piece as before but consists of sections mounted upon one or two hinges 39, so that the rolls of slips and record paper can be readily replaced by simply raising side doors or flaps, without taking the apparatus entirely apart.

Fig. 9 shows the paper slip which is employed in this second apparatus; upon it are printed semicircular rows of figures, and after the record has been made, the slip carries the pencil lines 41 showing the amount recorded.

In the example herein represented, it will be readily observed that the amount recorded is 24.75 francs.

The carbon paper which is interposed between the paper slip and the record band may consist of a band which is wound along with the record band or may be actuated by hand.

It should be observed that the apparatus may be used for a great variety of purposes. For instance the apparatus may be made in a reduced size and optionally in a simplified form, and will thus serve for the delivery of tramway slips or tickets, represented by the aforesaid slip, so that the operations of the conductors may be readily checked.

Having now particularly described my invention and in what manner the same is to be performed, I claim as my invention:

1. A registering apparatus characterized by the fact that the figures of the number to be registered are registered by a displacement of registering elements which is proportional to the values of said figures, in which the operator inscribes upon a record band suitable data which are transferred to a detachable slip, and that the operator displaces the registering elements by means of an inscribing point.

2. An adding and recording apparatus comprising totalizing mechanisms, members perforated with holes which are actuated by sinking a pointed object in the holes, said members actuating the totalizing mechanisms, and a strip of paper located under the perforated members, so that by sinking a pencil in the holes it bears on the paper.

3. Apparatus according to claim 1, wherein the paper strip carries monetary graduations corresponding to the holes of the actuating member.

Signed at Paris this 6th day of September, 1927.

LOUIS RIBIÉRAS.